United States Patent
Liu (10) Patent No.: US 11,199,868 B2
(45) Date of Patent: Dec. 14, 2021

(54) CLOCK SKEW CORRECTION METHOD, DEVICE AND SYSTEM

(71) Applicant: ZHENGZHOU YUNHAI INFORMATION TECHNOLOGY CO., LTD., Henan (CN)

(72) Inventor: Tao Liu, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 568 days.

(21) Appl. No.: 16/096,662

(22) PCT Filed: Sep. 5, 2017

(86) PCT No.: PCT/CN2017/100501
§ 371 (c)(1),
(2) Date: Oct. 25, 2018

(87) PCT Pub. No.: WO2018/103391
PCT Pub. Date: Jun. 14, 2018

(65) Prior Publication Data
US 2021/0223816 A1    Jul. 22, 2021

(30) Foreign Application Priority Data
Dec. 8, 2016 (CN) .......................... 201611119531.8

(51) Int. Cl.
*G06F 1/04* (2006.01)
*G06F 1/24* (2006.01)
(Continued)

(52) U.S. Cl.
CPC .................. *G06F 1/10* (2013.01); *G06F 1/08* (2013.01); *G06F 1/14* (2013.01)

(58) Field of Classification Search
CPC ..................................... G06F 1/00; G06F 1/10
See application file for complete search history.

(56) References Cited

U.S. PATENT DOCUMENTS

| 2008/0107218 A1 | 5/2008 | Andrew et al. |
| 2014/0029633 A1* | 1/2014 | Hamamatsu .......... H04J 3/0667 370/509 |

(Continued)

FOREIGN PATENT DOCUMENTS

| CN | 101174239 A | 5/2008 |
| CN | 102082655 A | 6/2011 |

(Continued)

OTHER PUBLICATIONS

International Search Report for PCT/CN2017/100501 dated Dec. 7, 2017, ISA/CN.

*Primary Examiner* — Mohammed H Rehman
(74) *Attorney, Agent, or Firm* — Yue (Robert) Xu; Apex Attorneys at Law, LLP (57) ABSTRACT

A clock skew correcting method, device and system are provided. The method includes: determining at least two modules; determining a period of a clock signal and calculating a delay parameter of each of the at least two modules, in a case where a clock generator transmits the clock signal to each of the at least two modules; determining one of the at least two modules as a slave module and the other of the at least two modules as at least one main module; correcting a clock phase for each of the at least one main module based on the delay parameter of the slave module; and performing, for each of the at least one main module, the following step of generating a corrected clock for the main module based on the period and the corrected clock phase for the main module.

8 Claims, 6 Drawing Sheets

(51) Int. Cl.
*G06F 11/00* (2006.01)
*G06F 1/10* (2006.01)
*G06F 1/08* (2006.01)
*G06F 1/14* (2006.01)

(56) References Cited

U.S. PATENT DOCUMENTS

| | | | |
|---|---|---|---|
| 2014/0079409 A1* | 3/2014 | Ruffini | H04J 3/0667 398/154 |
| 2014/0198810 A1* | 7/2014 | Jones | G06F 1/10 370/507 |
| 2014/0269673 A1* | 9/2014 | Yin | H04J 3/0667 370/350 |
| 2015/0163003 A1* | 6/2015 | Takahashi | H04J 3/0667 370/509 |
| 2017/0315582 A1 | 11/2017 | Bo et al. | |

FOREIGN PATENT DOCUMENTS

| | | |
|---|---|---|
| CN | 102638324 A | 8/2012 |
| CN | 104317354 A | 1/2015 |
| CN | 106774634 A | 5/2017 |
| WO | 2011063167 A1 | 5/2011 |
| WO | 2013143385 A1 | 10/2013 |

* cited by examiner

CLOCK SKEW CORRECTION METHOD, DEVICE AND SYSTEM

This application is the national phase of International Patent Application No. PCT/CN2017/100501, titled "CLOCK SKEW CORRECTION METHOD, DEVICE AND SYSTEM", filed on Sep. 5, 2017, which claims the priority to Chinese Patent Application No. 201611119531.8, titled "CLOCK SKEW CORRECTION METHOD, DEVICE AND SYSTEM", filed on Dec. 8, 2016 with the Chinese Patent Office, both of which are incorporated herein by reference in their entireties.

FIELD

The present disclosure relates to the technical field of computers, and in particular to a clock skew correcting method, a clock skew correcting device and a clock skew correcting system.

BACKGROUND

High-speed peripheral chips, such as SAS controllers, network card chips and other high-speed IO chips, are increasingly used on mainboards of servers. During the operation of the high-speed peripheral chips, it is required to transmit a synchronous clock signal to each of the high-speed peripheral chips and the CPU by a clock generator on the mainboard for clock synchronization.

With diversifying types of the high-speed peripheral chips, there are various references on levels at interfaces of the high-speed peripheral chips, resulting in various standards for high-speed peripheral chips in determining whether a synchronous clock signal has a high level or a low level. For example, a level of a synchronous clock signal above 2.0V is determined as a high level by a LVCOMS interface, and a level of a synchronous clock signal above 1.1V is determined as a high level by a GTL interface. Effective response durations of the synchronous clock signals transmitted to the high-speed peripheral chips and the CPU are different due to the various determination standards. That is, time skew occurs between the synchronous clock in the high-speed peripheral chip and the synchronous clock in the CPU.

SUMMARY

A clock skew correcting method, a clock skew correcting device and a clock skew correcting system are provided according to the embodiments of the present disclosure, with which clock skew can be corrected.

A clock skew correcting method is provided, which includes:
  determining at least two modules;
  determining a period of a clock signal and calculating a delay parameter of each of the at least two modules, in a case where a clock generator transmits the clock signal to each of the at least two modules;
  determining one of the at least two modules as a slave module and the other of the at least two modules as at least one main module;
  correcting a clock phase for each of the at least one main module based on the delay parameter of the slave module; and
  performing, for each of the at least one main module, the following step of:
    generating a corrected clock for the main module based on the period and the corrected clock phase for the main module.

In an embodiment of the present disclosure, the calculating the delay parameter of each of the at least two modules includes:
  performing, for each of the at least two modules, the following steps of:
    recording a threshold delay of a transition of the clock signal received by the module from a low a low level to a trigger level of the module;
    calculating a path delay of the module according to the following calculation equation one:

$$y_i = \Sigma A D_{ij}$$

where $Y_i$ represents a path delay of a module i, A represents a delay per unit length, and $D_{ij}$ represents a length of a path j connected with the module i; and
    calculating a total delay of the module based on the threshold delay and the path delay.

In an embodiment of the present disclosure, the calculating the total delay of the module includes:
  calculating the total delay of the module according to the following calculation equation two:

$$Y_i = \alpha x_i + \beta y_i$$

where $Y_i$ represents a total delay of the module i, α represents a weight for the threshold delay, $x_i$ represents a threshold delay of the module i, β represents a weight for the path delay, and $y_i$ represents a path delay of the module i.

In an embodiment of the present disclosure, the correcting the clock phase for each of the at least one main module based on the delay parameter of the slave module includes:
  performing, for each of the at least one main module, the following steps of:
    determining the total delay of the main module and the total delay of the slave module;
    calculating a difference between the total delay of the main module and the total delay of the slave module; and
    advancing/postponing, based on the difference, a transition to a phase at a rising edge in the clock phase for the main module.

In an embodiment of the present disclosure, the method further includes: providing each of the at least one main module with a timer, the generating the corrected clock for the main module includes:
  monitoring the clock signal received by the main module;
  triggering the timer to start timing when it is monitored that a phase of the clock signal received by the main module is consistent with the corrected clock phase; and
  triggering the timer to reset and shut down when a timing duration of the timer is equal to the period.

A clock skew correcting device is further provided, which is arranged in an external module. The clock skew correcting device includes a calculating unit, a correcting unit, a transmitting unit and a generating unit.

The calculating unit is configured to determine a period of a clock signal and calculate a delay parameter of the external module, in a case where a clock generator transmits the clock signal to the external module.

The correcting unit is configured to receive a delay parameter of an external first slave module transmitted by the first slave module and correct a clock phase for a first main module, in a case where the external module is the first main module.

The transmitting unit is configured to transmit a delay parameter of a second slave module calculated by the calculating unit to an external second main module in a case where the external module is the second slave module.

The generating unit is configured to generate a corrected clock for the first main module based on the period determined by the calculating unit and the clock phase corrected by the correcting unit, in a case where the external module is the first main module.

In an embodiment of the present disclosure, the calculating unit includes a recording sub-unit, a first calculating sub-unit and a second calculating sub-unit.

The recording sub-unit is configured to record a threshold delay of a transition of the clock signal received by the external module from a low level to a trigger level of the external module.

The first calculating sub-unit is configured to calculate a path delay of the external module according to following calculation equation one:

$$y_i = \Sigma AD_{ij}$$

where $Y_i$ represents a path delay of an external module i, A represents a delay per unit length, and $D_{ij}$ represents a length of a path j connected with the module i.

The second calculating sub-unit is configured to calculate a total delay of the external module based on the threshold delay recorded by the recording sub-unit and the path delay calculated by the first calculating sub-unit.

In an embodiment of the present disclosure, the second calculating sub-unit is configured to calculate the total delay of the external module according to the following calculation equation two:

$$Y_i = \alpha x_i + \beta y_i$$

where $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i.

In an embodiment of the present disclosure, the device further includes a timer. The generating unit includes a clock signal monitoring sub-unit and a trigger sub-unit.

The clock signal monitoring sub-unit is configured to monitor the clock signal received by the first main module in a case where the external module is the first main module.

The trigger sub-unit is configured to trigger the timer to start timing when the clock signal monitoring sub-unit monitors that a phase of the clock signal received by the first main module is consistent with the clock phase corrected by the correcting unit, and trigger the timer to reset and shut down when a timing duration of the timer is equal to the period determined by the calculating unit.

A clock skew correcting system is further provided, which includes at least two modules and a clock generator. Each of the at least two modules is provided with the clock skew correcting device according to any one of claims 6 to 9. The clock generator is configured to transmit a clock signal to the clock skew correcting device arranged in each of the at least two modules.

The at least two modules include: one main module and at least one slave module.

The clock skew correcting device arranged in the main module is connected to the clock skew correcting device arranged in each of the at least one slave module via a bus and is configured to receive, via the bus, a delay parameter of the slave module transmitted by the clock skew correcting device arranged in the slave module.

The clock skew correcting device arranged in each of the at least one slave module is configured to transmit the delay parameter of the slave module.

A clock skew correcting method, a clock skew correcting device and a clock skew correcting system are provided according to the embodiments of the present disclosure. At least two modules are determined. In a case where a clock generator transmits a clock signal to each of the at least two modules, a period of the clock signal is determined and a delay parameter of each of the at least two modules is calculated. One of the at least two modules is determined as a slave module and the other of the at least two modules is determined as at least one main module. A clock phase for each of the at least one main module is corrected based on the delay parameter of the slave module. The following step is performed for each of the at least one main module: generating a corrected clock for the main module based on the period and the corrected clock phase for the main module. The clock phase for each of the at least one main module is corrected based on the delay parameters, such that the clock phase of the slave module is consistent with the clock phase of the main module, and the period is fixed, thereby correcting the clock skew.

BRIEF DESCRIPTION OF THE DRAWINGS

For more clearly illustrating embodiments of the present disclosure or the technical solution in the conventional technology, drawings referred to describe the embodiments or the conventional technology are briefly described hereinafter. Apparently, the drawings in the following description are only several embodiments of the present disclosure, and for the person skilled in the art other drawings may be obtained based on these drawings without any creative efforts.

DETAILED DESCRIPTION

For making the objects, technical solutions and advantages of the embodiments of the present disclosure more clear, the technical solutions in the embodiments of the present disclosure will be described clearly and completely hereinafter in conjunction with the drawings in the embodiments of the present disclosure. The described embodiments are one part of the embodiments of the present disclosure, rather than all embodiments. Based on the embodiments in the present disclosure, all of other embodiments, made by the person skilled in the art without any creative efforts, fall into the scope of the present disclosure.

Figure 1:
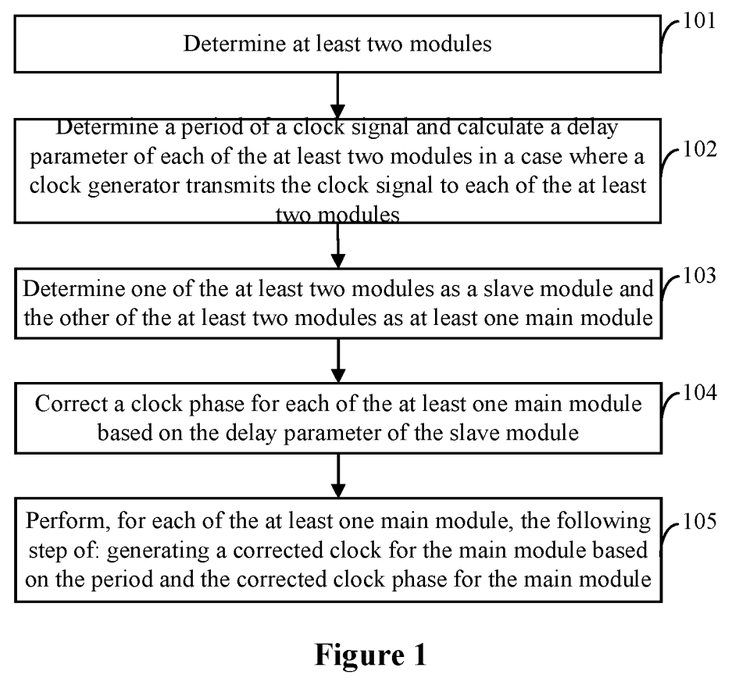
FIG. 1 is a flowchart of a clock skew correcting method according to an embodiment of the present disclosure.

As shown in FIG. 1, a clock skew correcting method is provided according to an embodiment of the present disclosure, which includes the following steps 101 to 105.

In step 101, at least two modules are determined.

In step 102, in a case where a clock generator transmits a clock signal to each of the at least two modules, a period of the clock signal is determined and a delay parameter of each of the at least two modules is calculated.

In step 103, one of the at least two modules is determined as a slave module and the other of the at least two modules is determined as at least one main module.

In step 104, a clock phase for each of the at least one main module is corrected based on the delay parameter of the slave module.

In step 105, the following step is performed for each of the at least one main module: generating a corrected clock for the main module based on the period and the corrected clock phase for the main module.

In the embodiment referring to FIG. 1, at least two modules are determined. In a case where a clock generator transmits a clock signal to each of the at least two modules, a period of the clock signal is determined and a delay parameter of each of the at least two modules is calculated. One of the at least two modules is determined as a slave module and the other of the at least two modules is determined as at least one main module. A clock phase for each of the at least one main module is corrected based on the delay parameter of the slave module. The following step is performed for each of the at least one main module: generating a corrected clock for the main module based on the period and the corrected clock phase for the main module. The clock phase for each of the at least one main module is corrected based on the delay parameters, such that the clock phase of the slave module is consistent with the clock phase of the main module, and the period is fixed, thereby correcting the clock skew.

In an embodiment of the present disclosure, in order to ensure the accuracy of the calculation on the delay parameters, step 102 includes: performing, for each of the at least two modules, the following steps of:

recording a threshold delay of a transition of the clock signal received by the module from a low level to a trigger level of the module;

calculating a path delay of the module according to the following calculation equation (1):

$$y_i = \Sigma A D_{ij} \quad (1)$$

where $Y_i$ represents a path delay of a module i, A represents a delay per unit length, and $D_{ij}$ represents a length of a path j connected with the module i; and calculating a total delay of the module based on the threshold delay and the path delay.

For example, a delay per etch of a path is represented by A, which is 7 ps, a module 1 has three connection paths respectively having lengths of 2 etches, 3 etches and 5 etches, the path delay of the module 1 calculated according to the above calculation equation (1) is 70 ps.

In an embodiment of the present disclosure, in order to ensure the reasonableness of the total delay, the calculating the total delay of the module includes:

calculating the total delay of the module according to the following calculation equation (2):

$$Y_i = \alpha x_i + \beta y_i \quad (2)$$

where $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i. In order to obtain a reasonable total delay, the threshold delay and the path delay may be assigned with weights according to actual needs. That is, the threshold delay is assigned with a greater weight in a case where the threshold delay plays a major role in the clock skew correction, and the path delay is assigned with a greater weight in a case where the path delay plays a major role in the clock skew correction. In a case where the threshold delay and the path delay play the similar role, the weights may be assigned as follows: $\alpha=1$, $\beta=1$. In this case, $Y_i = x_i + y_i$.

In an embodiment of the present disclosure, step 104 includes: performing, for each of the at least one main module, the following steps of:

determining the total delay of the main module and the total delay of the slave module;

calculating a difference between the total delay of the main module and the total delay of the slave module; and advancing/postponing, based on the difference, a transition to a phase at a rising edge in the clock phase for the main module.

In an embodiment of the present disclosure, the method further includes: providing each of the at least one main module with a timer. Specifically, step 105 includes: monitoring the clock signal received by the main module; triggering the timer to start timing when it is monitored that a phase of the clock signal received by the main module is consistent with the corrected clock phase; and triggering the timer to reset and shut down when a timing duration of the timer is equal to the period.

Figure 2:
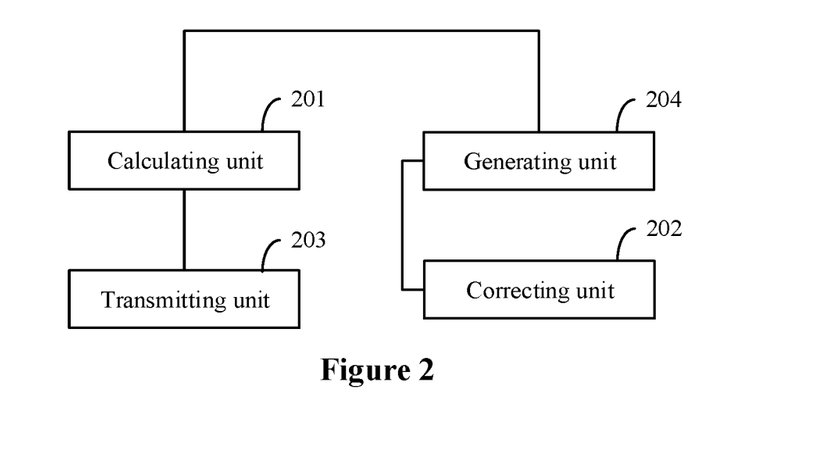
FIG. 2 is a schematic diagram of a structure of a clock skew correcting device according to an embodiment of the present disclosure.

As shown in FIG. 2, a clock skew correcting device is further provided according to an embodiment of the present disclosure. The clock skew device is arranged in an external module, and includes: a calculating unit 201, a correcting unit 202, a transmitting unit 203 and a generating unit 204.

The calculating unit 201 is configured to determine a period of a clock signal and calculate a delay parameter of the external module, in a case where a clock generator transmits the clock signal to the external module.

The correcting unit 202 is configured to receive a delay parameter of an external first slave module transmitted by the first slave module and correct a clock phase for a first main module, in a case where the external module is the first main module.

The transmitting unit 203 is configured to transmit a delay parameter of a second slave module calculated by the calculating unit 201 to an external second main module in a case where the external module is the second slave module.

The generating unit 204 is configured to generate a corrected clock for the first main module based on the period determined by the calculating unit 201 and the clock phase corrected by the correcting unit 202, in a case where the external module is the first main module.

Figure 3:
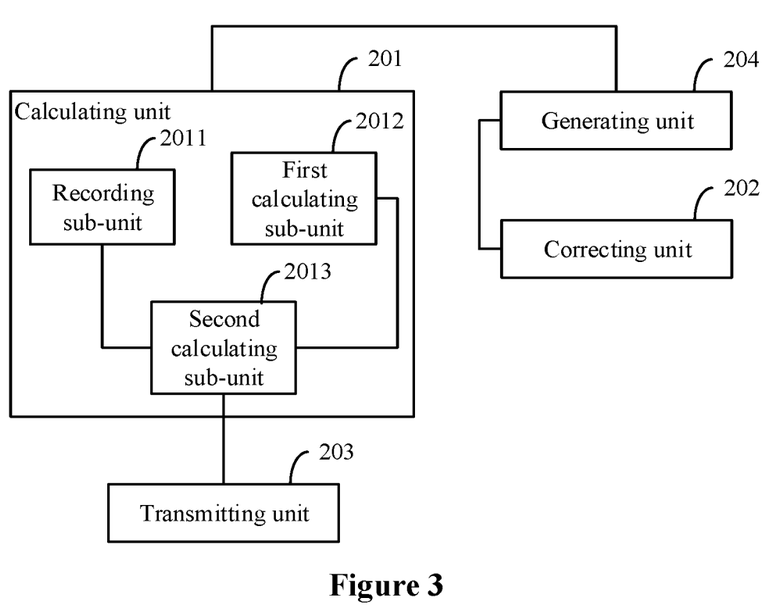
FIG. 3 is a schematic diagram of a structure of a clock skew correcting device according to another embodiment of the present disclosure.

In another embodiment of the present disclosure, as shown in FIG. 3, the calculating unit 201 includes a recording sub-unit 2011, a first calculating sub-unit 2012 and a second calculating sub-unit 2013.

The recording sub-unit 2011 is configured to record a threshold delay of a transition of the clock signal received by the external module from a low level to a trigger level of the external module.

The first calculating sub-unit 2012 is configured to calculate a path delay of the external module according to following calculation equation (1):

$$y_i = \Sigma A D_{ij} \qquad (1)$$

where $Y_i$ represents a path delay of an external module i, A represents a delay per unit length, and $D_{ij}$ represents a length of a path j connected with the module i.

The second calculating sub-unit 2013 is configured to calculate a total delay of the external module based on the threshold delay recorded by the recording sub-unit 2011 and the path delay calculated by the first calculating sub-unit 2012.

In another embodiment of the present disclosure, the second calculating sub-unit 303 is configured to calculate the total delay of the external module according to the following calculation equation (2):

$$Y_i = \alpha x_i + \beta y_i \qquad (2)$$

where $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i.

Figure 4:
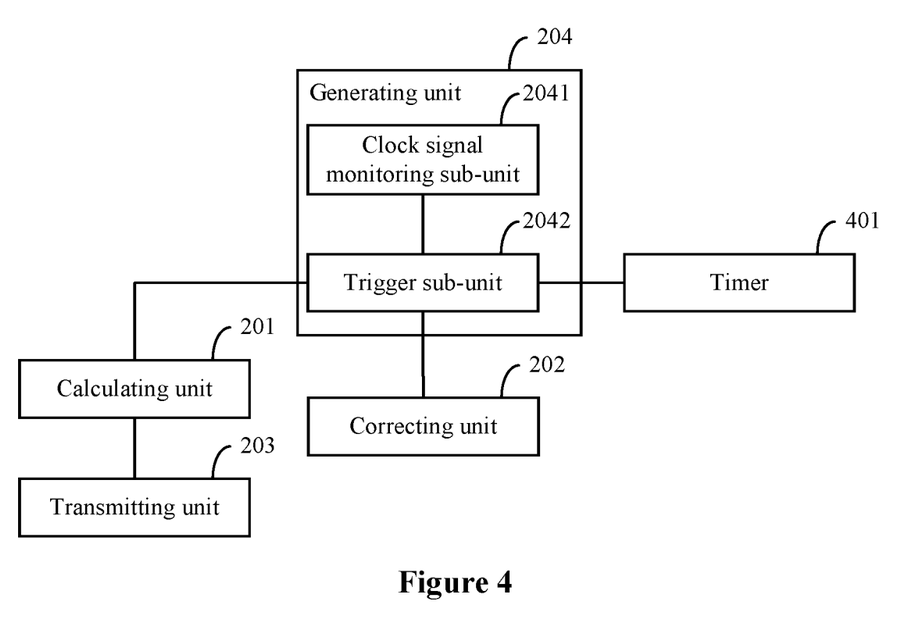
FIG. 4 is a schematic diagram of a structure of a clock skew correcting device according to another embodiment of the present disclosure.

As shown in FIG. 4, in another embodiment of the present disclosure, the device further includes a timer 401.

The generating unit 204 includes a clock signal monitoring sub-unit 2041 and a trigger sub-unit 2042.

The clock signal monitoring sub-unit 2041 is configured to monitor the clock signal received by the first main module in a case where the external module is the first main module.

The trigger sub-unit 2042 is configured to trigger the timer 401 to start timing when the clock signal monitoring sub-unit 2041 monitors that a phase of the clock signal received by the first main module is consistent with the clock phase corrected by the correcting unit 202, and trigger the timer 401 to reset and shut down when a timing duration of the timer is equal to the period determined by the calculating unit 201.

In another embodiment of the present disclosure, in a case where the external module is the first main module, the correcting unit 202 is configured to: determine a total delay of the first main module and a total delay of the first slave module; calculate a difference between the total delay of the first main module and the total delay of the first slave module; and advance/postpone, based on the difference, a transition to a phase at a rising edge in the clock phase for the first main module.

Figure 5:
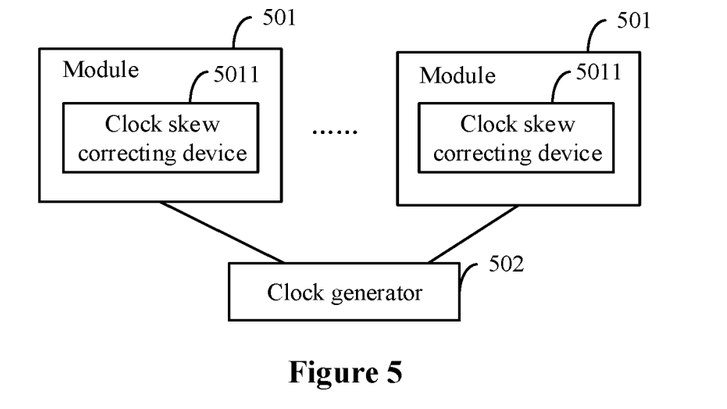
FIG. 5 is a schematic diagram of a structure of a clock skew correcting system according to an embodiment of the present disclosure.

As shown in FIG. 5, a clock skew correcting system is further provided according to an embodiment of the present disclosure, which includes: at least two modules 501 and a clock generator 502.

Each of the at least two modules 501 is provided with the clock skew correcting device 5011 described above.

The clock generator 502 is configured to transmit a clock signal to the clock skew correcting device arranged in each of the at least two modules.

The at least two modules 501 include: one main module and at least one slave module.

The clock skew correcting device arranged in the main module is connected to the clock skew correcting device arranged in each of the at least one slave module via a bus and is configured to receive, via the bus, a delay parameter of the slave module transmitted by the clock skew correcting device arranged in the slave module.

The clock skew correcting device arranged in each of the at least one slave module is configured to transmit the delay parameter of the slave module.

The clock skew correcting method is further described by taking a clock skew correcting system shown in FIG. 6 as an example hereinafter. As shown in FIG. 7, the method includes the following steps 701 to 710.

In step 701, at least two modules are determined, and each of the at least two modules is provided with a timer.

Figure 6:
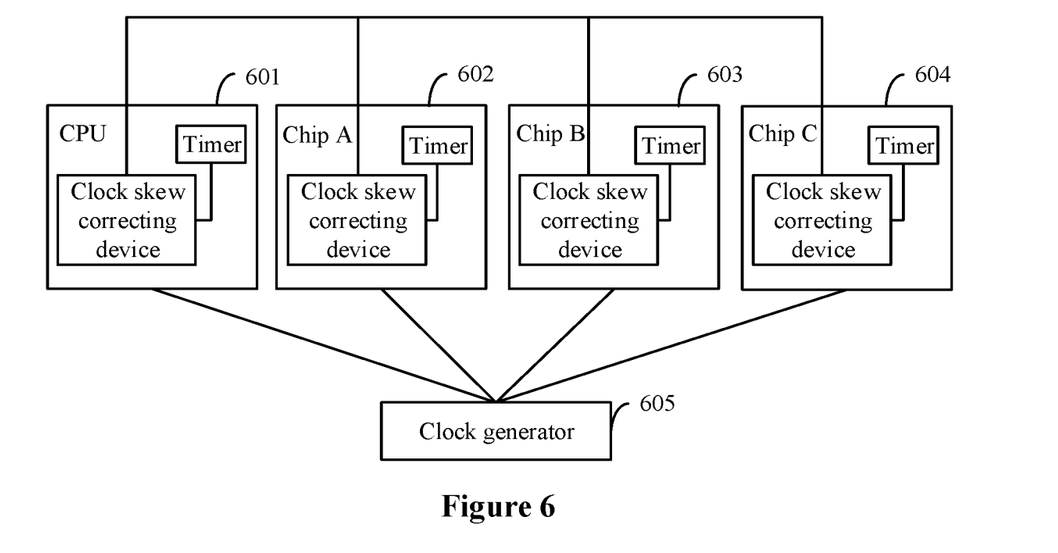
FIG. 6 is a schematic diagram of a structure of a clock skew correcting system according to another embodiment of the present disclosure.
Figure 7:
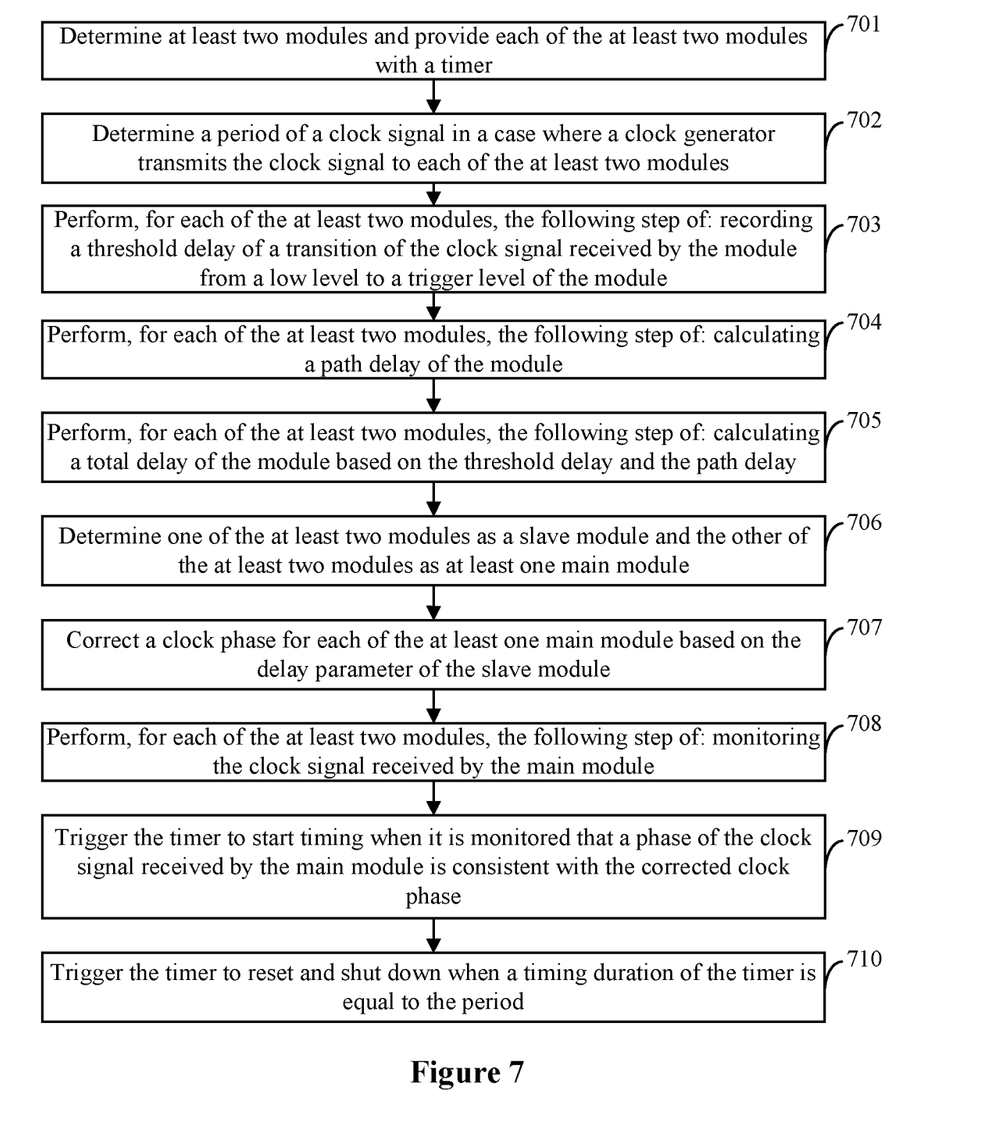
FIG. 7 is a flowchart of a clock skew correcting method according to another embodiment of the present disclosure.

As shown in FIG. 6, a mainboard of a server includes a CPU601, a chip A602, a chip B603 and a chip C604. Each of the CPU601, the chip A602, the chip B603 and the chip C604 is provided with the clock skew correcting device described above. The clock skew correcting device arranged in the CPU601 is connected to the clock skew correcting device arranged in the chip A602, the clock skew correcting device arranged in the chip B603 and the clock skew correcting device arranged in the chip C604 via an I2C bus. Each of the CPU601, the chip A602, the chip B603 and the chip C604 is provided with a timer.

In addition, the clock skew correcting device is arranged at a receiving end of each of the modules.

In step 702, in a case where a clock generator transmits a clock signal to each of the at least two modules, a period of the clock signal is determined.

As shown in FIG. 6, a clock generator 605 transmits a clock signal to the CPU601, the chip A602, the chip B603 and the chip C604. A time interval between a rising edge of the clock signal appeared currently and a rising edge of the clock signal appeared next time of the clock generator 605 is referred to as the period of the clock signal.

In step 703, the following step is performed for each of the at least two modules: recording a threshold delay of a transition of the clock signal received by the module from a low a low level to a trigger level of the module.

A duration of a transition of the clock signal received by the CPU601 in FIG. 6 from 0V to a trigger level, that is, a high level such as 2V, at the receiving end of the CPU601 is referred to as the threshold delay. Since the modules have different trigger levels from each other, the modules have different threshold delays from each other.

In step 704, the following step is performed for each of the at least two modules: calculating a path delay of the module.

In step 704, the path delay of the module is calculated according to the following equation (1):

$$y_i = \Sigma A D_{ij} \qquad (1)$$

where $Y_i$ represents a path delay of an external module i, A represents a delay per unit length, and $D_{ij}$ represents a length of a path j connected with the module i.

In step 705, the following step is performed for each of the at least two modules: calculating a total delay of the module based on the threshold delay and the path delay.

In step 705, the total delay of the module is calculated according to the following equation (2):

$$Y_i = \alpha x_i + \beta y_i \qquad (2)$$

where $Y_i$ represents a total delay of a module i, $\alpha$ represents a weight for the threshold delay, $x_i$ represents a threshold delay of the module i, $\beta$ represents a weight for the path delay, and $y_i$ represents a path delay of the module i.

In step 706, one of the at least two modules is determined as a slave module and the other of the at least two modules is determined as at least one main module.

For example, a task is generally allocated from a CPU to each of the chips, in step 706, the CPU601 in FIG. 6 may be determined as the slave module, and the chip A602, the chip B603 and the chip C604 are determined as the main modules.

In step 707, a clock phase for each of the at least one main module is corrected based on the delay parameter of the slave module.

Step 707 includes: performing, for each of the at least one main module, the following steps of:

determining a total delay of the main module and a total delay of the slave module;

calculating a difference between the total delay of the main module and the total delay of the slave module; and advancing/postponing, based on the difference, a transition to a phase at a rising edge in the clock phase of the main module.

Figure 8:
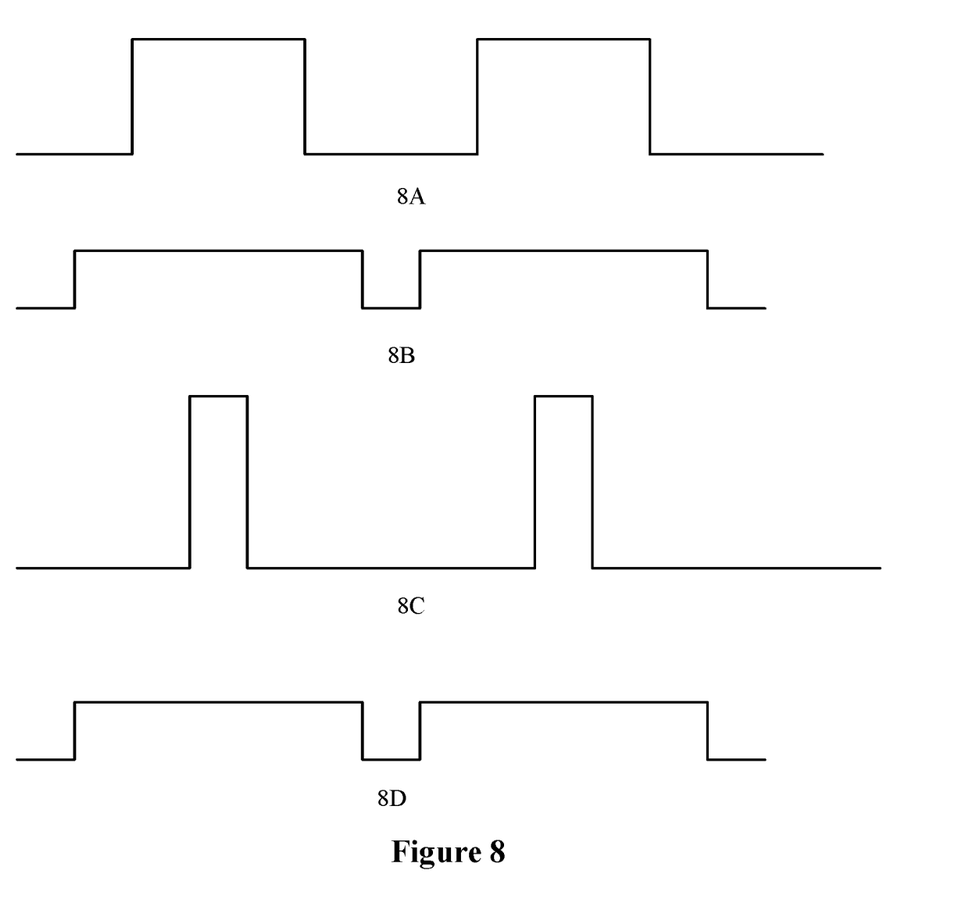
FIG. 8 are schematic diagrams showing a comparison between uncorrected clock phases and a corrected clock phase according to an embodiment of the present disclosure.

For example, a delay of the CPU 601 is 1 s, a delay of the chip A 602 is 2 s, a transition to a phase at a rising edge in a clock phase for the chip A 602 is advanced by is (2−1=1 s). For example, the delay of the CPU 601 is 1 s, the delay of the chip A 602 is 0.5 s, the transition to the phase at the rising edge in the clock phase for the chip A 602 is postponed by 0.5 s (1−0.5=0.55). As shown in FIG. 8, FIG. 8A, FIG. 8B and FIG. 8C respectively show schematic diagrams of uncorrected phases of the chip A 602, the chip B 603 and the chip C 604, and FIG. 8D shows a schematic diagram of a corrected phase of the chip A 602, the chip B 603 and the chip C 604. It can be seen from the drawings that the rising edges of the corrected phases are consistent with each other. Generally, when the clock signal is at the rising edge, the module is started to receive data through the receiving end. Since the rising edges of the corrected clock phases are consistent with each other, the synchronicity between the receptions of data by different modules can be ensured.

In step 708, the following step is performed for each of the at least one main module: monitoring the clock signal received by the main module.

In step 709, the timer is triggered to start timing when it is monitored that a phase of the clock signal received by the main module is consistent with the corrected clock phase.

In step 710, the timer is triggered to reset and shut down when a timing duration of the timer is equal to the period.

In step 709 and step 710, the reception of data is controlled through the timer. Since the rising edges for the modules are consistent with each other, the timers in the modules are started simultaneously. A signal generated by starting and shutting down the timer is used for data transmission, such that it can be ensured that the modules can receive the transmitted data simultaneously, thereby avoiding data omission caused by clock skew. In addition, error codes in data and repeated data transmissions can be reduced through clock skew correction, thereby effectively improving the transmission efficiency.

According to the above solutions, at least the following beneficial effects can be achieved with the embodiments of the present disclosure.

1. At least two modules are determined. In a case where a clock generator transmits a clock signal to each of the at least two modules, a period of the clock signal is determined and a delay parameter of each of the modules is calculated. One of the at least two modules is determined as a slave module and the other of the at least two modules is determined as at least one main module. A clock phase for each of the at least one main module is corrected based on the delay parameter of the slave module. The following step is performed for each of the at least one main module: generating a corrected clock for the main module based on the period and the corrected clock phase for the main module. The clock phase for each of the at least one main module is corrected based on the delay parameters, such that a clock phase of the slave clock is consistent with the clock phase of the main module, thereby correcting the clock skew.

2. The following steps are performed for each of the at least two modules: recording a threshold delay of a transition of the clock signal received by the module from a low a low level to a trigger level of the module; calculating a path delay of the module according to the a calculation equation one; and calculating a total delay of the module based on the threshold delay and the path delay. The delay is calculated by considering various factors, thereby ensuring the accuracy of the calculation of the delay parameters.

3. A timer is controlled to be switched on at a rising edge of the corrected clock signal, to control the module to receive data. Since the corrected clock phases for the modules are consistent with each other, the timers arranged in the modules are switched on or off simultaneously, such that the modules can receive data simultaneously, thereby reducing error codes in data and repeated data transmissions, thus effectively improving the transmission efficiency.

It should be further noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical factors in the process, method, article, or device that includes said elements.

It is to be understood by those skilled in the art that all or some of the steps for implementing the embodiments of the method described above may be achieved by means of hardware instructed by program instructions. The aforementioned program may be stored in a computer-readable storage medium, and when the program is executed, the steps including the embodiments of the method described above are executed. The above storage medium includes various medium that may store program codes, such as a ROM, a RANI, a magnetic disk or an optical disk.

It should be noted that the above description only shows preferred embodiments of the present disclosure, which is only for explaining the technical solutions of the present disclosure and is not intended to limit the protection scope of the present disclosure. Any modification, equivalent substitution, and improvement made without departing from the spirit and principle of the present disclosure are included in the scope of present disclosure.

The invention claimed is:

1. A clock skew correcting method, comprising:
   determining at least two modules;
   determining a period of a clock signal and calculating a delay parameter of each of the at least two modules, in a case where a clock generator transmits the clock signal to each of the at least two modules;
   determining one of the at least two modules as a slave module and the other of the at least two modules as at least one main module;
   correcting a clock phase for each of the at least one main module based on the delay parameter of the slave module; and
   performing, for each of the at least one main module, the following step of:

generating a corrected clock for the main module based on the period and the corrected clock phase for the main module, wherein the calculating the delay parameter of each of the at least two modules comprises:

performing, for each of the at least two modules, the following steps of:

recording a threshold delay of a transition of the clock signal received by the module from a low level to a trigger level of the module;

calculating a path delay of the module according to the following calculation equation one:

$$y_i = \Sigma AD_{ij}$$

wherein $y_i$ represents a path delay of a module i, A represents a delay per unit length, and $D_{ij}$ represents a length of a path j connected with the module i; and calculating a total delay of the module based on the threshold delay and the path delay, wherein the calculating the total delay of the module comprises:

calculating the total delay of the module according to the following calculation equation two:

$$Y_i = \alpha x_i + \beta y_i$$

wherein $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i.

2. The method according to claim 1, wherein the correcting the clock phase for each of the at least one main module based on the delay parameter of the slave module comprises:

performing, for each of the at least one main module, the following steps of:

determining the total delay of the main module and the total delay of the slave module;

calculating a difference between the total delay of the main module and the total delay of the slave module; and advancing/postponing, based on the difference, a transition to a phase at a rising edge in the clock phase for the main module.

3. The method according to claim 1, further comprising: providing each of the at least one main module with a timer, wherein the generating the corrected clock for the main module comprises:

monitoring the clock signal received by the main module;

triggering the timer to start timing when it is monitored that a phase of the clock signal received by the main module is consistent with the corrected clock phase; and triggering the timer to reset and shut down when a timing duration of the timer is equal to the period.

4. The method according to claim 1 wherein the correcting the clock phase for each of the at least one main module based on the delay parameter of the slave module comprises:

performing, for each of the at least one main module, the following steps of:

determining the total delay of the main module and the total delay of the slave module;

calculating a difference between the total delay of the main module and the total delay of the slave module; and advancing/postponing, based on the difference, a transition to a phase at a rising edge in the clock phase for the main module.

5. A clock skew correcting device arranged in an external module, comprising:

a calculating unit configured to determine a period of a clock signal and calculate a delay parameter of the external module, in a case where a clock generator transmits the clock signal to the external module;

a correcting unit configured to receive a delay parameter of an external first slave module transmitted by the first slave module and correct a clock phase for a first main module, in a case where the external module is the first main module;

a transmitting unit configured to transmit a delay parameter of a second slave module calculated by the calculating unit to an external second main module in a case where the external module is the second slave module; and a generating unit configured to generate a corrected clock for the first main module based on the period determined by the calculating unit and the clock phase corrected by the correcting unit, in a case where the external module is the first main module, wherein the calculating unit comprises:

a recording sub-unit configured to record a threshold delay of a transition of the clock signal received by the external module from a low level to a trigger level of the external module;

a first calculating sub-unit configured to calculate a path delay of the external module according to following calculation equation one:

$$y_i = \Sigma AD_{ij}$$

wherein $y_i$ represents a path delay of an external module i, A represents a delay per unit length, and $D_{ij}$ represents a length of a path j connected with the module i; and a second calculating sub-unit configured to calculate a total delay of the external module based on the threshold delay recorded by the recording sub-unit and the path delay calculated by the first calculating sub-unit, wherein the second calculating sub-unit is configured to calculate the total delay of the external module according to a following calculation equation two:

$$Y_i = \alpha x_i + \beta y_i$$

wherein $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i.

6. The device according to claim 5, further comprising a timer, wherein the generating unit comprises:

a clock signal monitoring sub-unit configured to monitor the clock signal received by the first main module in a case where the external module is the first main module; and a trigger sub-unit configured to trigger the timer to start timing when the clock signal monitoring sub-unit monitors that a phase of the clock signal received by the first main module is consistent with the clock phase corrected by the correcting unit, and trigger the timer to reset and shut down when a timing duration of the timer is equal to the period determined by the calculating unit.

7. A clock skew correcting system, comprising: at least two modules and a clock generator, wherein
  each of the at least two modules is provided with a clock skew correcting device,
  the clock generator is configured to transmit a clock signal to the clock skew correcting device arranged in each of the at least two modules,
  the at least two modules comprise: one main module and at least one slave module,
  the clock skew correcting device arranged in the main module is connected to the clock skew correcting device arranged in each of the at least one slave module via a bus and is configured to receive, via the bus, a delay parameter of the slave module transmitted by the clock skew correcting device arranged in the slave module,
  the clock skew correcting device arranged in each of the at least one slave module is configured to transmit the delay parameter of the slave module, wherein
  the clock skew correcting device comprises:
    a calculating unit configured to determine a period of a clock signal and calculate a delay parameter of the external module, in a case where a clock generator transmits the clock signal to the external module;
    a correcting unit configured to receive a delay parameter of an external first slave module transmitted by the first slave module and correct a clock phase for a first main module, in a case where the external module is the first main module;
    a transmitting unit configured to transmit a delay parameter of a second slave module calculated by the calculating unit to an external second main module in a case where the external module is the second slave module; and
    a generating unit configured to generate a corrected clock for the first main module based on the period determined by the calculating unit and the clock phase corrected by the correcting unit, in a case where the external module is the first main module,
  wherein the calculating unit comprises:
    a recording sub-unit configured to record a threshold delay of a transition of the clock signal received by the external module from a low level to a trigger level of the external module;
    a first calculating sub-unit configured to calculate a path delay of the external module according to following calculation equation one:

$$y_i = \Sigma A D_{ij}$$

wherein $y_i$ represents a path delay of an external module i, A represents a delay per unit length, and $D_{ij}$ represents a length of a path j connected with the module i; and
    a second calculating sub-unit configured to calculate a total delay of the external module based on the threshold delay recorded by the recording sub-unit and the path delay calculated by the first calculating sub-unit,
  wherein the second calculating sub-unit is configured to calculate the total delay of the external module according to a following calculation equation two:

$$Y_i = \alpha x_i + \beta y_i$$

wherein $Y_i$ represents a total delay of the module i, $\alpha$ represents a weight for the threshold delay, $x_i$ represents a threshold delay of the module i, $\beta$ represents a weight for the path delay, and $y_i$ represents a path delay of the module i.

8. The system according to claim 7, further comprising a timer, wherein
  the generating unit comprises:
    a clock signal monitoring sub-unit configured to monitor the clock signal received by the first main module in a case where the external module is the first main module; and
    a trigger sub-unit configured to trigger the timer to start timing when the clock signal monitoring sub-unit monitors that a phase of the clock signal received by the first main module is consistent with the clock phase corrected by the correcting unit, and trigger the timer to reset and shut down when a timing duration of the timer is equal to the period determined by the calculating unit.

\* \* \* \* \*